United States Patent [19]
Smith, Jr.

[11] Patent Number: 5,939,624
[45] Date of Patent: Aug. 17, 1999

[54] SLIDER FOR USE IN GLIDE HEAD DEVICE AND METHODOLOGY FOR FABRICATING THE SAME

[75] Inventor: Stanley Clifford Smith, Jr., Green Mountain Falls, Colo.

[73] Assignee: Micro Glide, Inc., Colorado Springs, Colo.

[21] Appl. No.: 08/826,784

[22] Filed: Apr. 7, 1997

[51] Int. Cl.$^6$ .................................................. G01B 5/28
[52] U.S. Cl. ............................................................. 73/105
[58] Field of Search .............................. 73/105; 360/103

[56] References Cited

U.S. PATENT DOCUMENTS

| | | |
|---|---|---|
| 5,086,360 | 2/1992 | Smith et al. . |
| 5,166,847 | 11/1992 | Zak . |
| 5,499,153 | 3/1996 | Uemura et al. . |

OTHER PUBLICATIONS

Jeong, T.G. and D.B. Bogy. "Natural Frequencies of Sliders and Transducers Used to Detect Slider–Disk Contacts", *IEEE Transactions on Magnetics*, vol. 25, No. 5. Sep. 1989: pp. 3725–3727.

Wallash, A. "Reproduction of Slider Vibrations During Head/Disk Interactions Using PZT Sensors". *IEEE Transactions on Magnetics*, vol. 24, No. 6. Nov. 1988: pp. 2763–2765.

Jorgensen, Finn. *The Complete Handbook of Magnetic Recording*, 4th ed. New York: McGraw–Hill Companies, 1996. pp. 383–388.

*Primary Examiner*—Daniel S. Larkin
*Attorney, Agent, or Firm*—Timothy J. Martin; Michael R. Henson

[57] ABSTRACT

A glide head device for attachment to a flexure and for operation with a test system to detect a presence of asperities on a moving surface includes a slider constructed as a rigid body that is adapted to be suspended from the flexure and a transducer operatively associated with the slider. The slider's rigid body includes an air bearing surface operative to be oriented in facing relation to the moving surface when in an operative state and a sidewall margin area adjacent the trailing edge which is microfinished to a selected Ra value, such as 200 angstroms. A glide head assembly and a test device incorporating such a glide head device are also provided.

24 Claims, 4 Drawing Sheets

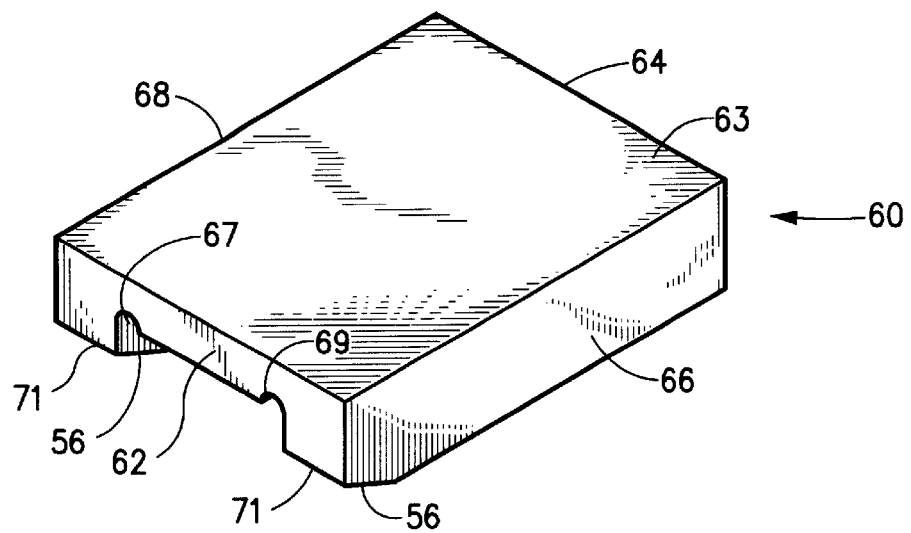
Fig.5
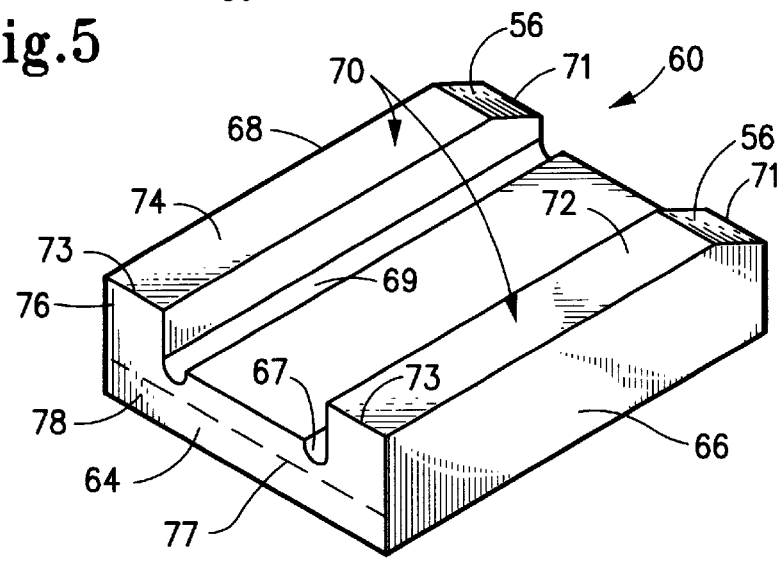
Fig.6
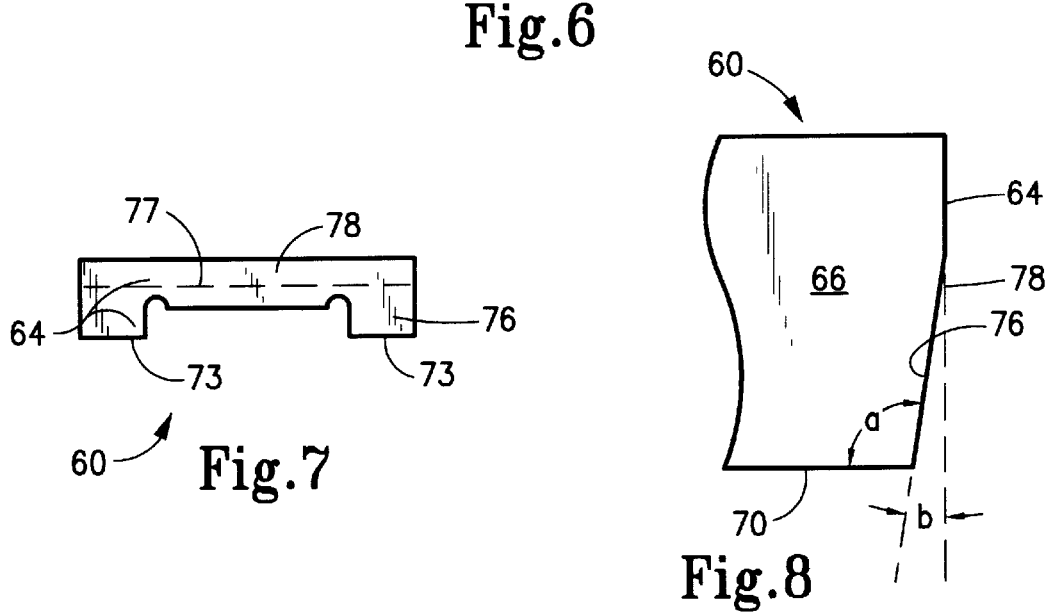
Fig.7
Fig.8

SLIDER FOR USE IN GLIDE HEAD DEVICE AND METHODOLOGY FOR FABRICATING THE SAME

FIELD OF INVENTION

The present invention is broadly directed to a glide head device adapted for use with a system for testing moving surfaces to detect a presence of asperities. More particularly, the present invention concerns an improved slider construction for use in a glide head device, which slider exhibits reduced structural degradation upon impact with an asperity. The present invention also relates to a test system which incorporates the improved slider construction and provides a method of fabricating the slider.

BACKGROUND OF THE INVENTION

In recent years, perhaps the most revolutionary development in technology has been the computer. While the fundamental components of a computer's architecture remain unchanged, the capabilities of these individual components have increased exponentially as technology rapidly progresses. Common to most every computer is a processing unit which receives input information and processes this information to generate an output. A computer program instructs the processing unit to perform various tasks, and an associated memory unit is incorporated to store instructions for the processing unit and to hold temporary results that may occur during operation.

Computer memories are used to store a system of on-off codes for access at a later time, and systems accomplish this in a variety of ways, such as through the utilization of magnetic disks, optical devices and the like. Where magnetic disks are concerned, patterns of magnetism are formed on the disks in order to store desired information. A magnetic disk may be in the form of either a floppy disk or an arrangement of hard disks which are permanently enclosed in a disk drive to prevent contamination. The hard disk drive for rigid, magnetic memory disks is akin to a conventional record turntable in that a mechanism rotates the disk and translates a read-write data head across the disk's surface to permit a selected annular track to be accessed.

Data heads are conventionally referred to as "flying" heads because they are not intended to contact the surface of the disk during rotation. Rather, these heads hover over the surface on an air bearing that is located between the disk and the head and which is caused, at least in part, by rotation of the magnetic disk at high speeds. The persisting problem with rigid magnetic memory disks is that asperities, i.e. protrusions on surfaces of the disks, may cause an anomaly when encountered by the data head. These asperities can cause errors in the transfer of information or even damage to the data head during operation. In an effort to alleviate such occurrences, manufactures commonly burnish the surfaces of disks. During the burnishing stage, a burnishing head is mounted in a similar manner relative to the disk as discussed above and operates to smooth out these surface asperities.

The next step in further refining magnetic disks for production is through the use of a glide head. A glide head detects, via proximity or contact, any asperities remaining after the burnishing operation which may come into contact with the data head during use. Glide heads are required to hover and detect asperities which are located above specified flying heights. Thus, glide heads dynamically test the integrity of a disk's surfaces.

To this end, a glide head assembly is utilized which includes a flexure and a glide head device disposed on the flexure. The glide head device, itself, comprises a slider having an air bearing surface that faces the disk's moving surface when in operation and a transducer associated with the slider. The transducer may take on a variety of different configurations and be mounted in a variety of different ways. For example, a piezoelectric transducer may be adhered between the upper surface of the slider and the flexure or adhered to the slider alone, independent of the flexure. My co-pending U.S. application Ser. No. 08/780,634, entitled GLIDE HEAD ASSEMBLY AND TEST DEVICE UTILIZING THE SAME, filed Jan. 8, 1997, relates to a legged piezoelectric transducer which may be mounted to the slider's trailing end surface to project outwardly therefrom. Another alternative is disclosed in my U.S. Pat. application Ser. No. 08/602,209, entitled GLIDE HEAD ASSEMBLY AND METHOD THEREFOR, filed Feb. 15, 1996, which shows that a piezoelectric transducer may also be configured as a flat plate and be sandwiched between the slider and the flexure so as to have an exposed free end portion which projects outwardly from this region.

Irrespective of the particular construction chosen, the crystalline lattice of the piezoelectric transducer is disturbed upon impact of the slider with a surface asperity. This disturbance causes an electronic signal to be sent to a signal processing circuitry. However, the same disturbance also causes a variety of other electronic signals to be sent to the signal processing circuitry. These signals are caused, at least in part, by resonant vibrations of other components in the glide head assembly, as well as inherent noise in the test system. As discussed in my co-pending patent applications, the particular construction of the glide head device is important to obtaining reliable electrical response characteristics during the asperity detection process.

While it is difficult to precisely control these electrical response characteristics, there is also a drawback to the existing construction for sliders used in conventional glide head devices. For the most part, existing sliders are constructed as rigid bodies having an air bearing surface that can take on a variety of different configurations. A widely used slider construction is one in which the rigid body is elongated and includes a pair of spaced apart, elongated rails. Each of the rails has an associated rail surface facing the disk's moving surface and, together, these rail surfaces define the air bearing surface. The air bearing surface is polished or lapped so that it is microfinished to have an Ra value in a range between 5 angstroms and 30 angstroms, where Ra is a roughness parameter known in the art and refers to the arithmetic deviation of a surface's peaks and valleys over a given sampling length. It is desirable to have a slider's air bearing surface polished very smoothly so that the glide head device exhibits desired flying height characteristics during use.

One end of the rigid body is provided with a leading edge ramp so that the slider hovers on an air foil at a desired pitch above the disk's surface. During the asperity detection process, then, most of the slider/asperity impact occurs near the trailing edge of the slider which is necessarily closer to the disk's surface than the leading edge. The trailing edge of the slider, therefore, has a tendency to degrade rather rapidly due to its repeated contact with asperities. Eventually, then, the slider needs to be replaced to avoid jeopardizing response characteristics.

Accordingly, a need exists to provide a new and useful glide head device having improved structural integrity, thereby to reduce degradation during the asperity detection process. There is a further need to provide a new and useful methodology for manufacturing such a slider. The present invention is directed to meeting these needs, among others.

SUMMARY OF INVENTION

It is an object of the present invention to provide and new and useful glide head device that is adapted for use with a test system for detecting a presence of asperities on a moving surface.

Another object of the present invention is to provide a new and useful glide head device having an improved slider construction which is less prone to structural degradation upon impact during the asperity detection process.

A further object of the present invention is to provide and new and useful test device for detecting asperities on the surface of a rotating magnetic disk, which test device utilizes a glide head assembly having an improved slider construction.

Yet another object of the present invention is to provide a new and useful methodology for fabricating an improved slider for use in a glide head assembly which slider exhibits reduced structural degradation during the asperity detection process.

In furtherance of these objectives, the present invention is in a broad sense directed to a glide head device adapted to be attached to a flexure and operative with a test system to detect a presence of asperities on a moving surface. The test system includes signal processing circuitry operative to process an electronic signal generated in response to a presence of an asperity.

The glide head device comprises a slider constructed as a rigid body adapted to be suspended from the flexure so as to have a leading edge and a trailing edge relative to the moving surface when in an operative state in the test system. The rigid body includes an air bearing surface operative to be oriented in facing relation to the moving surface when in the operative state and a sidewall margin area adjacent to the trailing edge. A transducer is associated with the slider and responds in the operative state to the presence of an asperity relative to the slider as the asperity moves past the slider to vibrate, thereby to produce the electronic signal.

The sidewall margin area of the rigid body's trailing end surface, which is adjacent to the trailing edge, may be microfinished to have an Ra value of less than 200 angstroms. Preferably, this Ra value is within a range of 5 angstroms to 30 angstroms, inclusively. Alternatively, the air bearing surface (ABS) may be microfinished to have a selected ABS Ra value, with the sidewall margin area microfinished to have a sidewall Ra value that is within a range of about ten times the ABS Ra value. Yet another alternative is to microfinish the trailing end surface of the slider to have two different values, whereby a first area of the trailing end surface is microfinished to have a first selected Ra value and a second area of the trailing end surface is microfinished to have a second selected Ra value that is different from the first. Here, it is preferred that the first one of these areas be located immediately adjacent to the trailing edge with the first selected Ra value less than the second selected Ra value. The first selected Ra value, again, is preferably within a range of 5 angstroms to 30 angstroms.

The transducer is preferably supported by the slider and may be mounted to the slider through the use of an appropriate adhesive to project outwardly therefrom. It is preferred to mount the transducer to a region of the rigid body which is microfinished to have a mounting region Ra value that is greater than the ABS Ra value to permit better adhesion on the rougher surface contour in this mounting region.

At least a portion of the trailing end surface defines the sidewall margin area and the sidewall margin area may be oriented at an obtuse angle relative to the air bearing surface. This obtuse angle is approximately 91° or 90° fifty minutes, and necessarily results from the lapping step during the manufacture process of the slider. The sidewall margin area may also be oriented perpendicularly to the air bearing surface. The air bearing surface may be defined by two separated areas.

The present invention also relates to a glide head assembly associated with a mounting structure and adapted for use with a test system to detect a presence of asperities on a moving surface. Here, the glide head assembly comprises a slider and a transducer, as discussed above, and further includes an elongated flexure. The flexure has a longitudinal axis and includes a first end portion attachable to the mounting structure and a second end portion opposite the first end portion which is adapted to be positioned in proximity to the moving surface when in an operative state. Electrical contacts are disposed on the transducer and located so as to connect to electrical leads supported by the flexure. A sleeve is preferably disposed longitudinally along the flexure and operates to receive and support these electrical leads. The slider may be elongated to include a mounting surface opposite the air bearing surface, a pair of longitudinally extending sidewall surfaces and a pair of transversely extending sidewall surfaces. A first one of the transversely extending sidewall surfaces intersects the air bearing surface at the leading edge to define a leading end surface of the slider, and a second one of the transversely extending sidewall surfaces intersects the air bearing surface at the trailing edge to define a trailing end surface of the slider. The slider may be formed to include first and second elongated rails having respective rail surfaces which, together, define the air bearing surface.

The present invention in another sense also relates to a test device for testing opposed moving surfaces of a rotating memory disk to determine a presence of asperities thereon. Here, the test device comprises a mounting structure, a rotary drive operative to rotate the memory disk relative to mounting structure, at least a first glide head assembly as discussed above, signal processing circuitry operative to process the electronic signal generated from the piezoelectric transducer, and electrical interconnects establishing electrical communication between the piezoelectric transducer and the signal processing circuitry.

The method of fabricating the slider according to the present invention comprises the steps of configuring an air bearing structure on a production piece slider blank to form a working production piece having an unpolished air bearing surface (ABS) and an outer sidewall surface which intersects the unpolished air bearing surface at a peripheral edge. This unpolished air bearing surface is then lapped to form a polished air bearing surface that is microfinished to a selected ABS Ra value. A step of lapping a region of the outer sidewall surface adjacent to the peripheral edge is also provided so as to form a sidewall margin area that is microfinished to a selected sidewall Ra value that is within a range of about ten times the selected ABS Ra value, thereby to form a finished production piece. In order to form the sidewall margin area, the working production piece is positioned on a planar lapping medium so that the air bearing surface is oriented at an acute angle relative to the planar lapping medium. Thereafter, the region is polished so that the sidewall margin area is formed at an obtuse angle of approximately 91° relative to the air bearing surface.

The methodology may also include a step of lapping a peripheral edge portion of the working production piece which is located opposite the sidewall margin area in order to form a leading edge ramp for the slider. The step of configuring the air bearing surface may be accomplished by initially cutting a surface of the production blank piece slider at a plurality of locations and thereafter removing material from the production piece slider blank to form a relief structure which defines the air bearing surface.

In order to fabricate a plurality of sliders, a plurality of air bearing structures are configured on the production piece slider blank to form an intermediate production blank defined by a plurality of interconnected production pieces each having an unpolished air bearing surface and an outer sidewall surface which intersects the unpolished air bearing surface at a peripheral edge. Thereafter, the intermediate production blank is cut into a plurality of working production pieces. The unpolished air bearing surface of each working production piece is then lapped to the selected ABS Ra value to form a polished air bearing surface, and each sidewall margin area is lapped to the selected sidewall Ra value, thereby to form a plurality of finished production pieces.

These and other objects of the present invention will become more readily appreciated and understood from a consideration of the following detailed description of the exemplary embodiment when taken together with the accompanying drawings, in which:

BRIEF DESCRIPTION OF DRAWINGS

FIG. 5 is an enlarged perspective view of a slider according to the exemplary embodiment of the present invention which forms a component part of the glide head assembly depicted in FIGS. 2–4;

FIG. 6 is another perspective view of the slider according to the exemplary embodiment of the present invention:

FIG. 7 is a rear view in elevation showing the trailing end surface of the slider according to the exemplary embodiment of the present invention;

FIG. 8 is an enlarged side view in elevation of a portion of the slider's longitudinal sidewall, as viewed near the trailing end;

DETAILED DESCRIPTION OF THE EXEMPLARY EMBODIMENT

The present invention provides an improved slider construction for use in a glide head assembly that is operative with a test system to detect a presence of asperities on a moving surface. The invention relates to a glide head device, a glide head assembly, and a test device, each of which incorporates the improved slider construction. The slider of the present invention is less prone to structural degradation upon impact with an asperity during the detection process. While the invention will be described with reference to a slider having a pair of rails, it should be appreciated that the inventive concepts herein can be equally applied to other types of slider constructions. Moreover, while the slider is described in conjunction with a transducer in the form of a piezoelectric crystal, it should also be understood that other types of transducers, such as an acoustic emissions transducer, could also be employed without departing from the inventive concepts herein.

Figure 1:
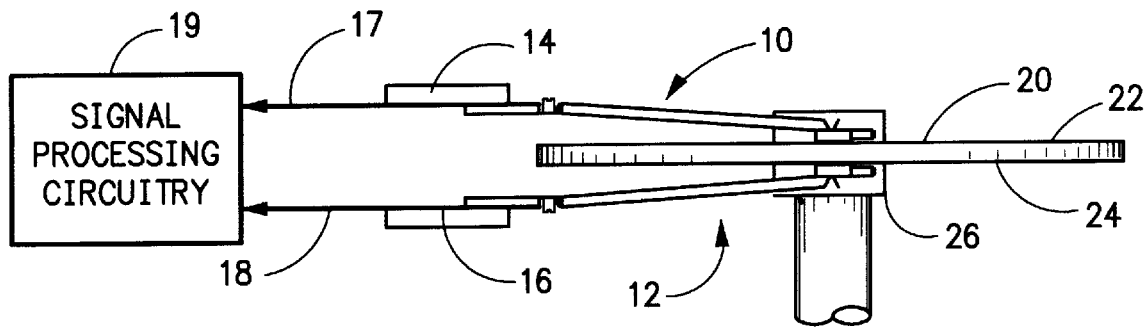
FIG. 1 is a diagrammatic side view in elevation of a pair of glide head assemblies incorporating the improved slider according to the present invention and showing the glide head assemblies in use to detect the presence of asperities on opposite moving surfaces of a magnetic disk.

While the particular construction of the slider according to the exemplary embodiment of present invention will be described in detail below, the invention is initially introduced with reference to FIGS. 1–4 which describe the environment of the slider's use. In FIG. 1, then, a pair of glide head assemblies 10 and 12 are shown in use detecting the presence of asperities on opposite surfaces of a rigid magnetic memory disk 20 that is journaled for rotation about a spindle 26. Each of glide head assemblies 10 and 12 has an associated mounting structure and is adapted for use with a test system for testing one of the moving surfaces of rigid magnetic memory disk 20. More particularly, upper glide head assembly 10 is secured to mounting structure 14 and is employed to detect asperities on an upper surface 22 of memory disk 20. Similarly, lower glide head assembly 12 is secured to a lower mounting structure 16 and detects asperities on a lower surface 24 of memory disk 20. Glide head assemblies 10 and 12 respectively communicate detection results, via electrical leads 17 and 18, to a test system that includes signal processing circuitry 19. As known in the art, signal processing circuitry 19 is capable of filtering signals received from glide head assemblies 10 and 12 to a desired bandwidth for monitoring.

Figure 2:
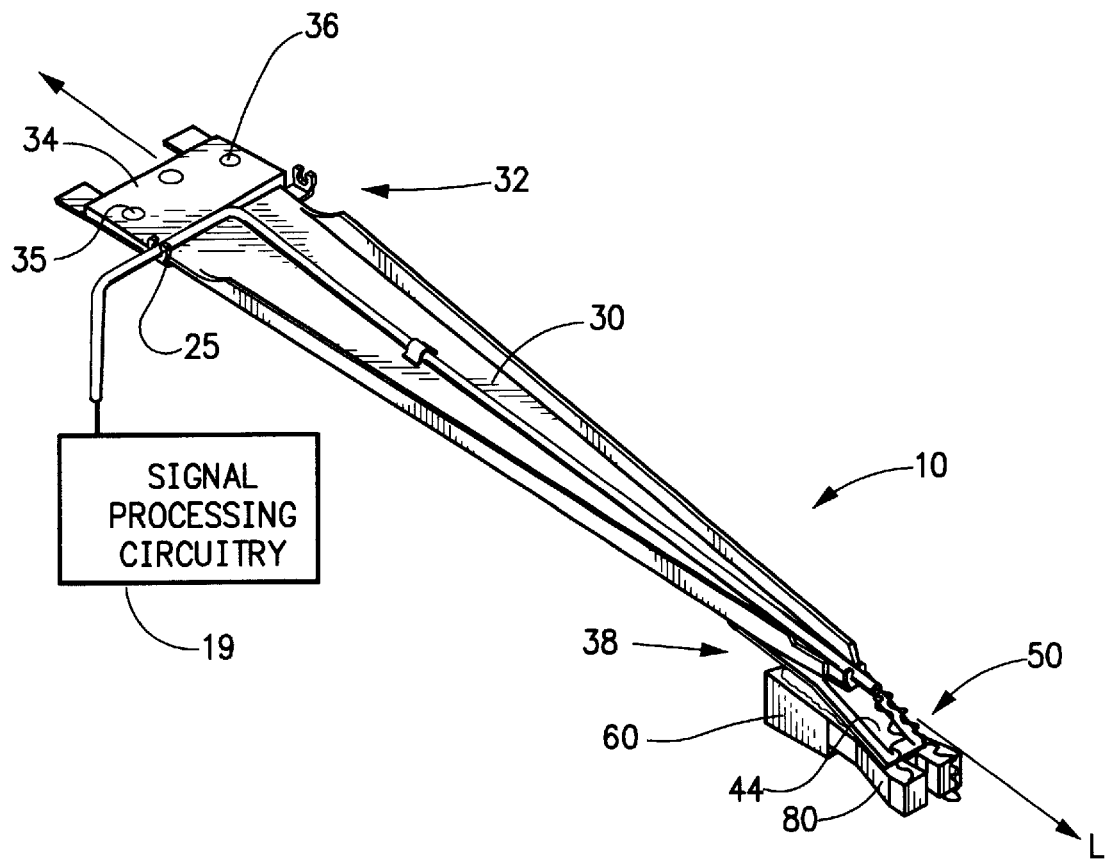
FIG. 2 is a perspective view of the construction of a representative one the glide head assemblies shown in FIG. 1.
Figure 3:
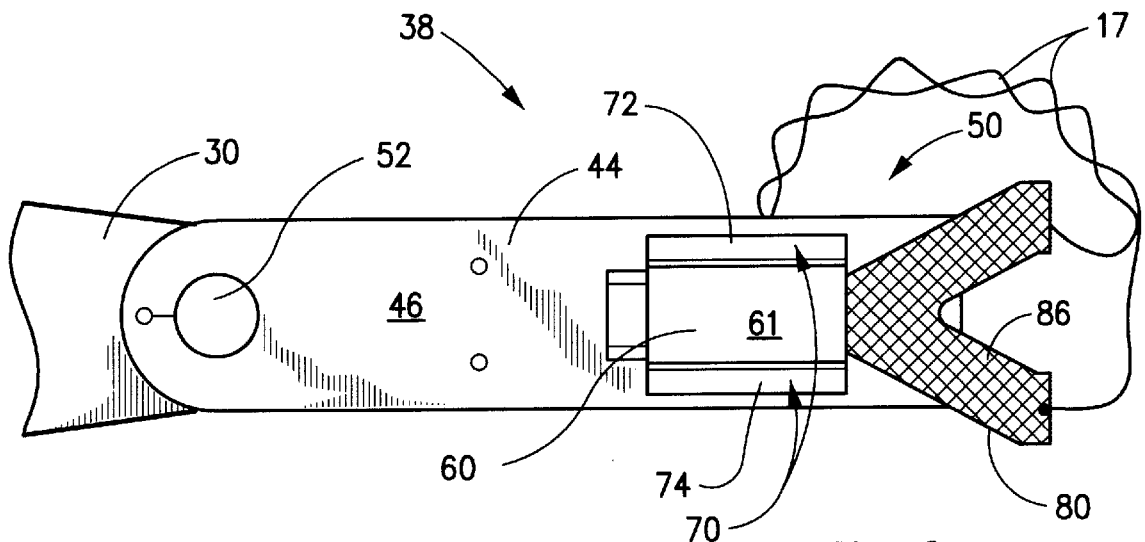
FIG. 3 is an enlarged bottom plan view of the second end portion for the glide head assembly shown in FIG. 2.
Figure 4:
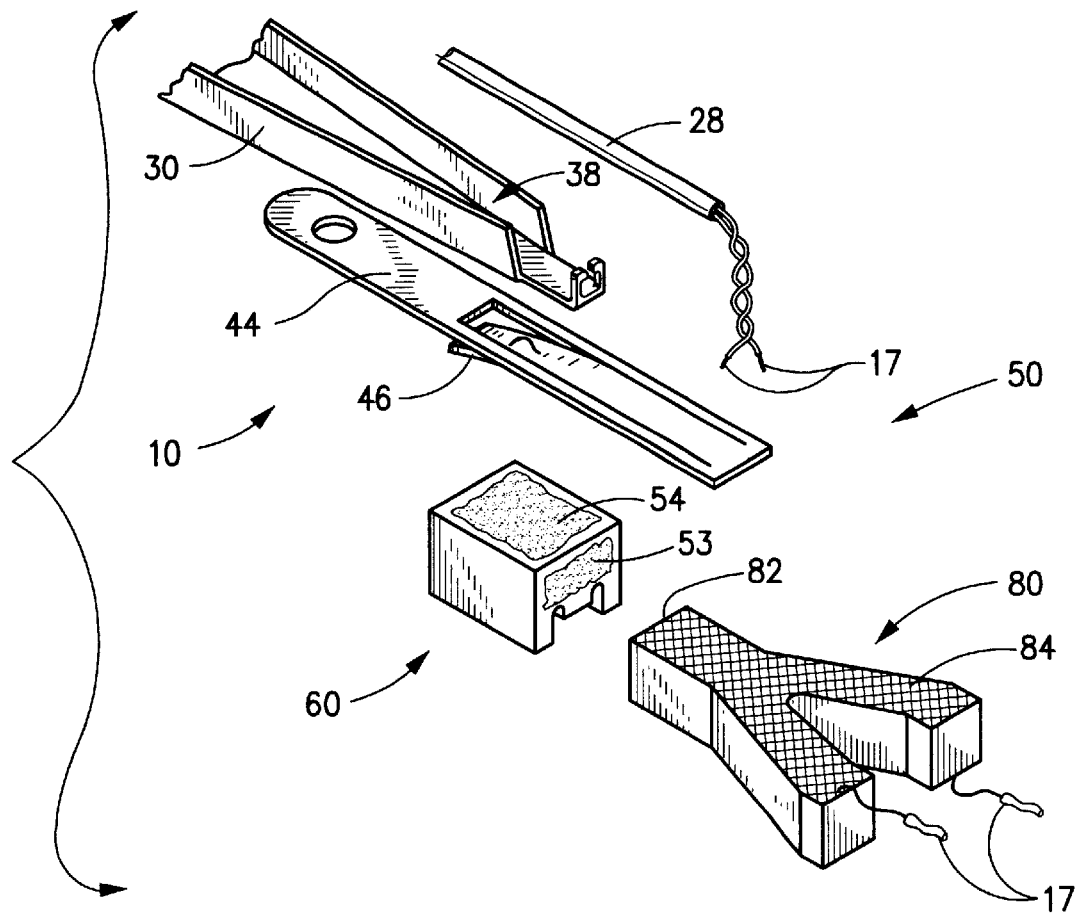
FIG. 4 is an exploded perspective view of a preferred construction for the second end portion of the glide head assembly shown in FIGS. 2–4.

The construction for upper glide head assembly 10 may best be appreciated with reference to FIGS. 2–4. It is understood, though, that lower glide head assembly 12 would be constructed similarly. Representative upper glide head assembly 10 broadly comprises an elongated flexure 30 and a glide head device 50 supported by flexure 30. Flexure 30 includes a first end portion 32 which is securable to the mounting structure 14 in FIG. 1 by a mounting bracket 34 provided with installation holes 35, 36. A second end portion 38 of flexure 30 is adapted to be positioned in proximity to the upper moving surface 22 of rigid memory disk 20 when in an operative state as shown in FIG. 1. Flexure 30 extends along a longitudinal axis "L" and includes a tongue 44 which forms part of second end portion 38. As shown in FIG. 3, tongue 44 may be registered with the flexure's main body by a tooling hole 52 and secured thereto by laser welding. With this in mind, flexure 30 is preferably a Type II flexure known in the art, but one of ordinary skill would appreciate that the other types of flexures could also be used.

The glide head device 50 associated with upper glide head assembly 10 broadly includes a slider 60 and a transducer 80 supported by slider 60. Transducer 80 may be in the form of a generally V-shaped piezoelectric crystal that is mounted to slider 60 to project outwardly therefrom. Other types of transducers, though, could also be employed. A proximal end surface 82 of piezoelectric transducer 80 is secured to slider 60 by a layer of first adhesive material 53. Slider 60 is secured to second end portion 38 of flexure 30, and specifically the lower surface 46 of tongue 44, by a second layer of adhesive material 54. First and second adhesive materials 53 and 54 preferably have certain bonding characteristics so that they can withstand physical and thermal shock over time.

When in an operative state, piezoelectric transducer 80 is responsive to the presence of an asperity relative to slider 60 as the asperity moves past slider 60 to vibrate, thereby to produce an electronic signal at a selected signal frequency. Slider 60 has a lower surface 61 which faces the disk's moving surface when in the operative state. Lower surface 61 may include a pair of rails, such as first rail 72 and second rail 74, which project approximately 0.005 inches away from lower surface 61 to define an air bearing surface 70 for slider 60. Thus, a central portion of lower surface 61 is recessed relative to rails 72, 74 so as to have negligible influence on the air bearing. Rails 72 and 74 are designed to fly in close proximity to asperities as they are encountered by glide head assembly 10.

Electrical leads 17 are respectively connected to opposite surfaces 84 and 86 of piezoelectric transducer 80. Layers of gold conducting material may be provided for these connections. Electrical leads 17 operate to communicate electrical signals to central processing circuitry 19. A sleeve 28 is disposed longitudinally along flexure 30 and this sleeve 28 receives and supports electrical leads 17.

The construction for slider 60 according to the present invention will now be described in reference to FIGS. 5–8. In many respects, slider 60 is constructed similarly to conventional sliders which have been used in the past. That is, slider 60 is a generally rectangular rigid body which includes a pair of longitudinally extending sidewall surfaces 66 and 68 and a pair of transversely extending sidewall surfaces 62 and 64.

An air bearing surface 70 is operative to be oriented in facing relation to the disk's moving surface when in the operative state. Here, slider 60 includes first and second rails 72 and 74, respectively, which together define air bearing surface 70. Due to current fabrication techniques, the formation of the slider's rigid body to include rails 72 and 74 necessarily results in the formation of a pair of channel grooves 67 and 69 so that channel groove 67 is associated with first rail 72 and channel groove 69 is associated with second rail 74. A mounting surface 63 is located opposite air bearing surface 70 and is adapted to be mounted, through an appropriate adhesive or otherwise, in facing relationship with the flexure.

Slider 60 may be suspended from a flexure in the mounted state so as to have a leading edge 71 and a trailing edge 73 relative to a disk's moving surface when in an operative state in a test system. Leading edge 71 is preferably ramped in the region 56 of first and second rails 72, 74 so that slider 60 hovers on an air foil above the rotating disk at a desired pitch.

Slider 60 includes a second transversely extending sidewall surface 64 which, for convenience, will be referred to herein as the trailing end surface of slider 60. Unlike conventional sliders which are fabricated to have an Ra value of 200 angstroms or more on their trailing end surfaces, at least a portion of slider 60's trailing end surface 64 is specifically microfinished to have an Ra value of less than 200 angstroms. As understood by the ordinarily skilled artisan, Ra is a measurement of a surface's texture and refers to the arithmetic deviation of a surface's peaks and valleys over a given sampling length. A widely used reference for surface roughness is ANSI Y 14.36-1978.

During the fabrication of conventional sliders, only the air bearing surface is microfinished to have an Ra value of less than approximately 200 angstroms. As such, the remainder of these sliders' surfaces is quite rough in relation to the air bearing surface. A major drawback of existing slider design, however, is that during the asperity detection process, the slider has a tendency to degrade rather rapidly over time due to its continual encounter with asperities. Repeated impact has a tendency to impair the structural integrity of the slider by chipping away at its surface. Over time, it becomes necessary to replace the slider so that detection results are not jeopardized.

It has surprisingly been found, however, that by lapping or microfinishing at least a portion of the slider's trailing end surface to a more refined degree than currently done, the useful lifetime and structural integrity of a slider can be increased. To this end, and as is best illustrated in FIGS. 6 and 7, a sidewall margin area 76 of the slider's trailing end surface, which is adjacent to the slider's trailing edge 73, is microfinished to have a sidewall Ra value which is less than 200 angstroms but preferably approximates the air bearing surface Ra value. A typical air bearing surface Ra value is in a range of approximately 5 angstroms to 30 angstroms, inclusively. It is preferred that the remainder of the slider's trailing end surface 64 have an Ra value greater than this range to provide a sufficiently roughened surface for mounting a transducer in this region. As such, sidewall margin area 76 represents a first area of trailing end surface 64 which is microfinished to have a selected first Ra value, while a second area 78 of trailing end surface 64 is microfinished to have a selected second Ra value which is different and preferably greater than the selected first Ra value.

For illustration purposes only, that portion of trailing end surface 64 which defines sidewall margin area 76 is distinguished from second area 78 in FIGS. 6 and 7 by a dotted line 77. It should be readily understood, then, that dotted line 77 does not actually exist but only represents the demarcation in the figures between sidewall margin areas 76 and second area 78. It should also be appreciated that sidewall margin area 76 could encompass the entire surface area of the slider's trailing end surface 64 so that the entire trailing end surface 64 is microfinished to the degree discussed above. This might be desirable, for example, if the glide head device of choice did not incorporate a transducer mounted to the slider's trailing end surface 64, but rather mounted to some other portion of the slider.

FIG. 8 is an enlarged view of the slider's sidewall 66, as viewed near the trailing end region, and shows that the sidewall margin area 76 is actually oriented at an obtuse angle "a" relative to air bearing surface 70. This angle "a" is approximately 91°, or 90° and 50 minutes to be more precise. As such, that portion of trailing end surface 64 which contains sidewall margin area 76 is oriented at an acute angle "b" that is approximately 1° relative to that portion of trailing end surface 64 which contains second area 78. The entirety of trailing end surface 64 could also be oriented perpendicularly to air bearing surface 70. However, as discussed more thoroughly below, the necessary polishing to achieve the desired Ra value for sidewall margin area 76 does not make this cost effective.

Figure 9:
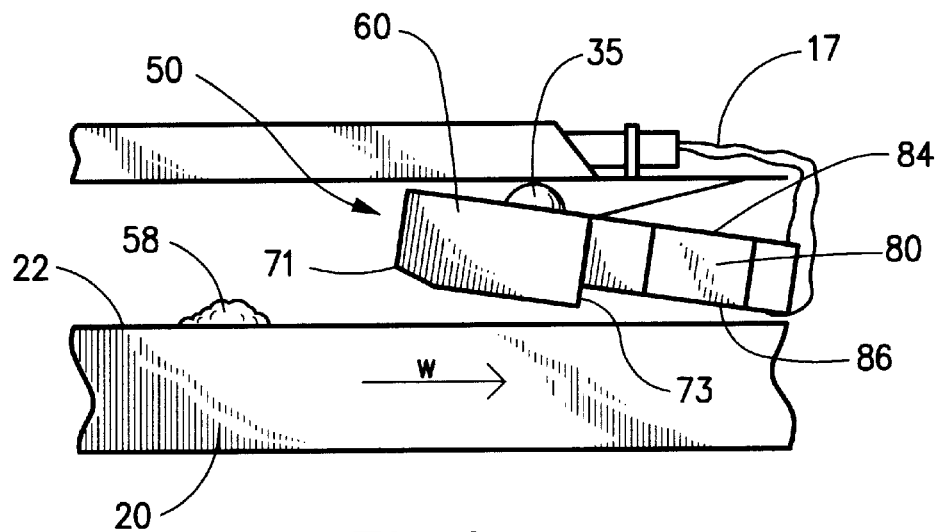
FIG. 9 is a partial side view in elevation of the glide head assembly in FIGS. 2–4 and showing the glide head approaching the asperity on the surface of the rotating magnetic disk.

With the foregoing construction in mind for the slider 60 according to the present invention, the ability of the slider to better withstand impact with an encountered asperity may be appreciated with reference to FIG. 9. The leading edge 71 of slider 60 is preferably ramped to provide stability to slider 60 so that glide head structure 50 may fly with a certain pitch. This prevents glide head structure 50, and specifically slider 60, from flying too close to upper surface 22 and scoring rigid memory disk 20 during operation. Leading edge 71 hovers approximately 14μ inches above upper surface 22, while trailing edge 73 hovers approximately 1μ inch above upper surface 22. Of course, actual flying heights of the leading trailing edges 71, 73 would necessarily depend on the various test conditions of the system, such as the width of the air bearing surface, disk speed, ramp angle, etc.

It may be readily understood, then, that as an asperity 58 approaches, it comes into contact with trailing edge 73. This in turn causes slider 60 to pivot about an orientation nub 35 disposed on tongue 44 so that slider 60 is urged upwardly. This excitation causes a disturbance in the crystalline lattice of the piezoelectric transducer 80 and results in a voltage distribution between its upper and lower surfaces 84, 86. An electronic signal is generated in electrical leads 17 and this signal is communicated back to the test system's signal processing circuitry.

However, it should also be appreciated that the slider's repeated contact with asperities, such as asperity 58 in FIG. 9, would eventually have a tendency to wear down the structural integrity of the slider's trailing edge 73. Understandably, one would want to avoid these corrosive effects and it is for this reason that the slider of the present invention is specifically constructed to have a highly microfinished sidewall margin area immediately adjacent to the trailing edge because this makes the slider less prone to degradation in this region.

With the foregoing description in mind relating to the construction and operation of the slider according to the exemplary embodiment of the present invention, a methodology of fabricating the slider is also provided. Preferably, the method of fabrication involves the production of a plurality of sliders. The fabrication process begins with the mounting of a production piece slider blank, or wafer, onto an expendable substrate. The production piece slider blank is mounted with an adhesive that will withstand the conditions of fabricating the air bearing surface as well as allow the sliders to be debonded quickly. The production piece slider blank must be mounted in such a way that it is flat to within two ten-thousandths of an inch to meet the high tolerances of the sliders.

Where the fabrication of conventional two-rail sliders is concerned, the steps include cutting channels into the production piece slider blank to form an intermediate production blank. Initial cuts are made to form the inside vertical surfaces of the rails for each slider. A second cutting step may be incorporated to form the width dimension of the slider and the outside of the rails. This second cutting step would be incorporated, for example, if it is desirous to form two-rail sliders that each have outside rail surfaces flush with the slider's outer sidewall surface. The next step is to remove any remaining material between the rails so that the intermediate production blank includes a plurality of interconnected production pieces, with each interconnected production piece having an unpolished air bearing surface and an outer sidewall surface which intersects the air bearing surface at a peripheral edge. Then, the intermediate production blank is rotated 90° and cut into a plurality of working production pieces.

The working production pieces are then debonded, cleaned and mounted on precisely machined transfer tools. They are then lapped to their overall thickness. At this point, an angle is lapped onto a peripheral edge portion of each working production piece thereby to form a leading edge ramp for the slider. A region of each slider's outer sidewall surface which is located adjacent to the peripheral edge, and opposite the leading edge ramp, may also be lapped to form a sidewall margin area that is microfinished to a selected sidewall Ra value that is within a range of about ten times the Ra value of the air bearing surface, thereby to form a plurality of finished production pieces.

Figure 10:
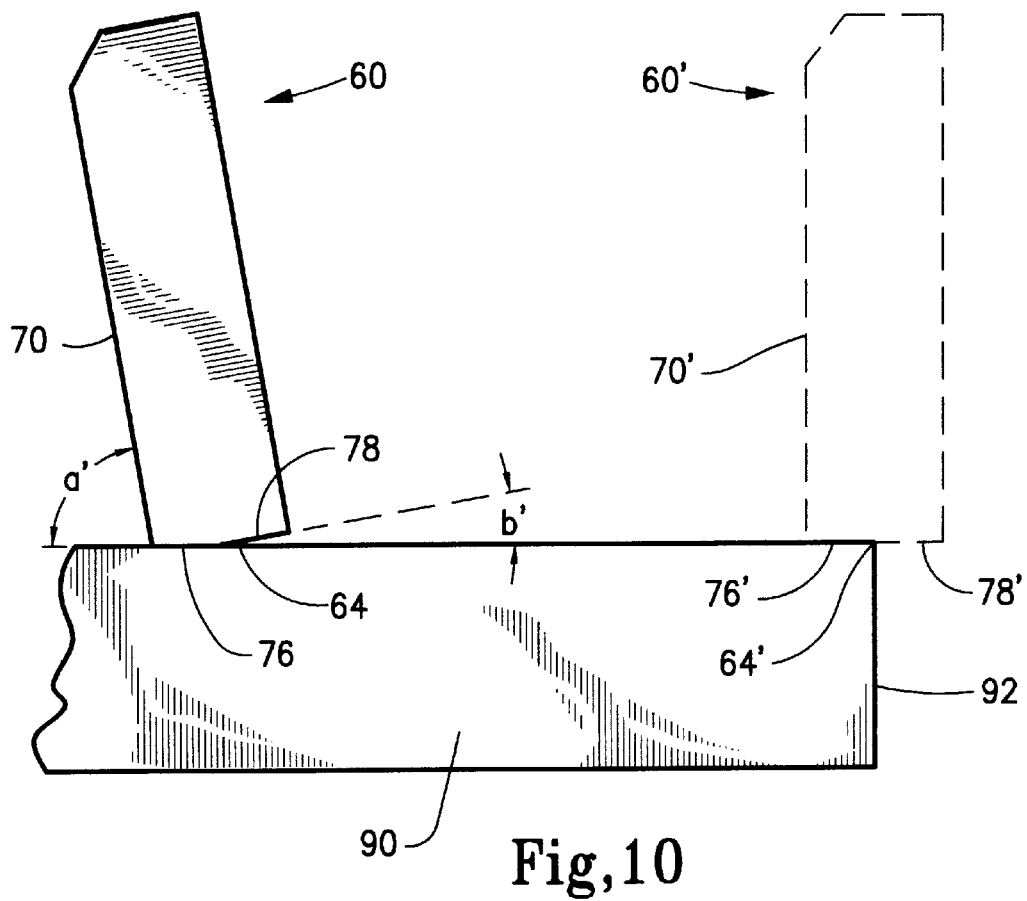
FIG. 10 is a side view in elevation illustrating the lapping stage which forms one of the steps in the fabrication process for the slider.

FIG. 10 illustrates two possible ways of lapping the sidewall margin area during the slider's fabrication process. In FIG. 10, the slider is shown positioned at an acute angle "a'" on a lapping wheel 90 to provide the microfinished surface to its trailing end surface. While not shown, the slider would of course be positioned on lapping wheel 90 through the use of a precisely machined transfer tool. Where it is desirable to have two areas of the slider's trailing end surface that are finished to a different degree, the slider may be canted on the lapping wheel as shown by slider 60 in FIG. 10. As such, the sidewall margin area 76 adjacent to the slider's air bearing surface 70 is lapped or polished to the sidewall Ra value, while a remainder of the slider's trailing end surface 64, as represented by region 78, is oriented at an acute angle "b'" relative to sidewall margins area 76.

If, however, it is desirable to have the slider's entire trailing end surface oriented perpendicular to the air bearing surface, then the trailing end surface may be positioned flush on the lapping wheel. While this is much more difficult to accomplish due to manufacturing constraints, FIG. 10 does show one approach to doing this. For example, a slider 60' may be precisely positioned on the end 92 of the lapping wheel 90 so that a portion 78' of its trailing end surface 64' overhangs from lapping wheel 90. Here, then, the sidewall margin area 76' can be polished and maintained at an angle perpendicular to air bearing surface 70'. With this technique, either the entire trailing end surface, or only a portion thereof, may be lapped to a desired degree of roughness. Of course, FIG. 10 only represents two possible approaches to lapping the sidewall margin area, and one of ordinary skill would certainly appreciate that other approaches can be taken.

Broadly, then, the method of fabrication includes the steps of: (1) configuring an air bearing structure on a production piece slider blank to form an working production piece having an unpolished air bearing surface and an outer sidewall surface which intersects the unpolished air bearing surface at a peripheral edge; (2) lapping the unpolished air bearing surface thereby to form a polished air bearing surface (ABS) which is microfinished to a selected ABS Ra value; and (3) lapping a region of the outer sidewall surface which is adjacent to the peripheral edge to form a sidewall margin area that is microfinished to a selected sidewall Ra value within a range of about ten times the ABS Ra value, thereby to form a finished production piece. The methodology may also include a step of lapping a peripheral edge portion of the working production piece which is located opposite the sidewall margin area thereby to form a leading edge ramp for the slider.

The step of configuring the air bearing structure may be accomplished by initially cutting a surface of the production piece slider blank at a plurality of locations and thereafter removing material from the production piece slider blank to form a relief structure which defines the unpolished air bearing surface. In order to form the sidewall margin area, the working production piece may be positioned on a planar lapping medium so that the air bearing surface is oriented at an acute angle relative to the planar lapping medium. Thereafter, the region is polished so that the sidewall margin area is formed at an obtuse angle relative to the air bearing surface.

For the fabrication of a plurality of sliders, a plurality of air bearing structures are configured on the production piece slider blank to form an intermediate production blank defined by a plurality of interconnected production pieces which each has an unpolished air bearing surface and an outer sidewall surface which intersects the unpolished air bearing surface at a peripheral edge. The intermediate production blank may then be cut into a plurality of working production pieces. The unpolished air bearing surface of each working production piece may then be lapped to the selected ABS Ra value to form a polished air bearing surface, and each sidewall margin area may be lapped to the selected sidewall Ra value, thereby to form a plurality of finished production pieces.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiment of the present invention without departing from the inventive concepts contained herein.

I claim:

1. A glide head device adapted to be attached to a flexure and operative with a test system to detect a presence of asperities on a moving surface, comprising:

(a) a slider constructed as a rigid body adapted to be suspended from the flexure so as to have a leading edge and a trailing edge relative to the moving surface when in an operative state in the test system, said rigid body including an air bearing surface operative to be oriented in facing relation to the moving surface when in the operative state and a sidewall margin area adjacent to the trailing edge which is microfinished to have an Ra value of less than 200 angstroms; and (b) a transducer operatively associated with said slider.

2. A glide head device according to claim 1 wherein said Ra value is within a range of 5 angstroms to 30 angstroms, inclusively.

3. A glide head device according to claim 1 wherein said transducer is supported by said slider.

4. A glide head device according to claim 1 wherein said transducer is mounted to said slider to project outwardly therefrom.

5. A glide head device according to claim 1 wherein said sidewall margin area is oriented at an obtuse angle relative to said air bearing surface.

6. A glide head device according to claim 5 wherein said angle is approximately 91°.

7. A glide head device according to claim 1 wherein said rigid body includes a pair of spaced-apart rails projecting toward the moving surface when said slider is in the operative state, said air bearing surface being defined by a rail surface of each of said rails which faces the moving surface.

8. A glide head device adapted to be attached to a flexure and operative with a test system to detect a presence of asperities on a moving surface, wherein the test system includes signal processing circuitry operative to process an electronic signal generated in response to the presence of an asperity, said glide head device comprising:

(a) a slider constructed as a rigid body that is adapted to be suspended from the flexure so as to have a leading edge and a trailing edge relative to the moving surface when in an operative state in the test system, said rigid body including an air bearing surface operative to be oriented in facing relation to the moving surface when in the operative state, said air bearing surface is microfinished to have a selected air bearing surface Ra value, there being a sidewall margin area of said body adjacent to the trailing edge which is microfinished to have a sidewall Ra value within a range of about ten times the air bearing surface Ra value; and (b) a transducer operatively associated with said slider and responsive in the operative state to the presence of an asperity relative to the slider as the asperity moves past the slider to vibrate, thereby to produce the electronic signal.

9. A glide head device according to claim 8 wherein the selected air bearing surface Ra value is in a range of 5 angstroms to 30 angstroms, inclusively.

10. A glide head device according to claim 8 wherein said air bearing surface is defined by two separated areas.

11. A glide head device according to claim 10 wherein said rigid body includes a pair of spaced-apart rails projecting toward the moving surface when said slider is in the operative state, said air bearing surface being defined by a rail surface of each of said rails which faces the moving surface.

12. A glide head device according to claim 8 wherein said rigid body includes a trailing end surface which intersects said air bearing surface at the trailing edge, at least a portion of said trailing end surface defining the sidewall margin area.

13. A glide head device according to claim 8 wherein said transducer is mounted to a region of said rigid body which is microfinished to have a mounting region Ra value that is greater than the selected air bearing surface Ra value.

14. A glide head device according to claim 13 wherein said transducer is adhered to said slider and projects outwardly therefrom.

15. A glide head device adapted to be attached to a flexure and operative with a test system to detect a presence of asperities on a moving surface, wherein the test system includes signal processing circuitry operative to process an electronic signal generated in response to the presence of an asperity, said glide head device comprising:

(a) a slider constructed as a rigid body that is adapted to be suspended from the flexure in a mounted state so as to have a leading edge and a trailing edge relative to the moving surface when in an operative state in the test system, said rigid body including an air bearing surface operative to be oriented in facing relation to the moving surface when in the operative state and a trailing end surface contiguous with said air bearing surface along said trailing edge, said trailing end surface having two different areas, a first one of said areas being microfinished to have a selected first Ra value and a second one of said areas being microfinished to have a selected second Ra value different from the first Ra value; and (b) a transducer associated with said slider and responsive in an operative state to the presence of an asperity relative to the slider as the asperity moves past the slider to vibrate, thereby to produce the electronic signal.

16. A glide head device according to claim 15 wherein the first one of said areas is located immediately adjacent to said trailing edge and wherein said first Ra value is less than said second Ra value.

17. A glide head device according to claim 16 wherein said first selected Ra value is within a range of 5 angstroms to 30 angstroms, inclusively.

18. A glide head assembly associated with a mounting structure and adapted for use with a test system for detecting a presence of asperities on a moving surface, wherein the test system includes signal processing circuitry operative to process an electronic signal generated in response to the presence of an asperity, said glide head assembly comprising:

(a) an elongated flexure having a longitudinal axis and including a first end portion attachable to said mounting structure and a second end portion opposite said first end portion, said second end portion adapted to be positioned in proximity to the moving surface when in an operative state;

(b) a slider constructed as a rigid body and suspended from said flexure in a mounted state so as to have a leading edge and a trailing edge relative to the moving surface, said rigid body including an air bearing surface operative to be oriented in facing relation to the moving surface, there being a sidewall margin area of said rigid body adjacent to the trailing edge which is microfinished to have an Ra value of less than 200 angstroms; and (c) a piezoelectric transducer supported by said flexure, said piezoelectric transducer responsive in the operative state to the presence of an asperity relative to the slider as the asperity moves past the slider to vibrate, thereby to produce the electronic signal at a selected signal frequency.

19. A glide head assembly according to claim 18 including electrical contacts disposed on said transducer and located so as to connect to electrical leads supported by said flexure.

20. A glide head assembly according to claim 19 including a sleeve disposed longitudinally along said flexure, said sleeve operative to receive and support said electrical leads.

21. A glide head assembly according to claim 18 wherein said Ra value is within a range of 5 angstroms to 30 angstroms, inclusively.

22. A glide head assembly according to claim 18 wherein said rigid body is elongated and includes a mounting surface opposite said air bearing surface, a pair of longitudinally extending sidewall surfaces and a pair of transversely extending sidewall surfaces, a first one of said transversely extending sidewall surfaces intersecting said air bearing surface at the leading edge to define a leading end surface of said slider and a second one of said transversely extending sidewall surfaces intersecting said air bearing surface at the trailing edge to define a trailing end surface of said slider.

23. A glide head assembly according to claim 22 wherein said rigid body includes a pair of spaced-apart rails projecting toward the moving surface when said slider is in the operative state, said air bearing surface being defined by a rail surface of each of said rails which faces the moving surface.

24. A test device for testing opposed moving surfaces of a rotating memory disk to determine a presence of asperities thereon, comprising:

(a) a mounting structure;

(b) a rotary drive operative to rotate the memory disk relative to said mounting structure;

(c) at least a first glide head assembly supported by said mounting structure, said first glide head assembly including:

(1) an elongated flexure having a longitudinal axis and including a first end portion attachable to said mounting structure and a second end portion opposite said first end portion, said second end portion adapted to be positioned in proximity to the moving surface when in an operative state;

(2) a slider constructed as a rigid body and suspended from said flexure in a mounted state so as to have a leading edge and a trailing edge relative to the moving surface, said body including an air bearing surface operative to be oriented in facing relation to the moving surface, there being a sidewall margin area of said body adjacent to the trailing edge which is microfinished to have an Ra value of less than 200 angstroms; and (3) a piezoelectric transducer supported by said slider and said flexure, said transducer responsive in the operative state to the presence of an asperity relative to the slider as the asperity moves past the slider to vibrate, thereby to produce the electronic signal at a selected signal frequency;

(d) signal processing circuitry operative to process the electronic signal; and (e) electrical interconnects establishing electrical communication between said piezoelectric transducer and said signal processing circuitry.

* * * * *